W. D. POMEROY.
DYNAMO ELECTRIC MACHINE.
APPLICATION FILED MAY 3, 1906.
957,249.
Patented May 10, 1910.
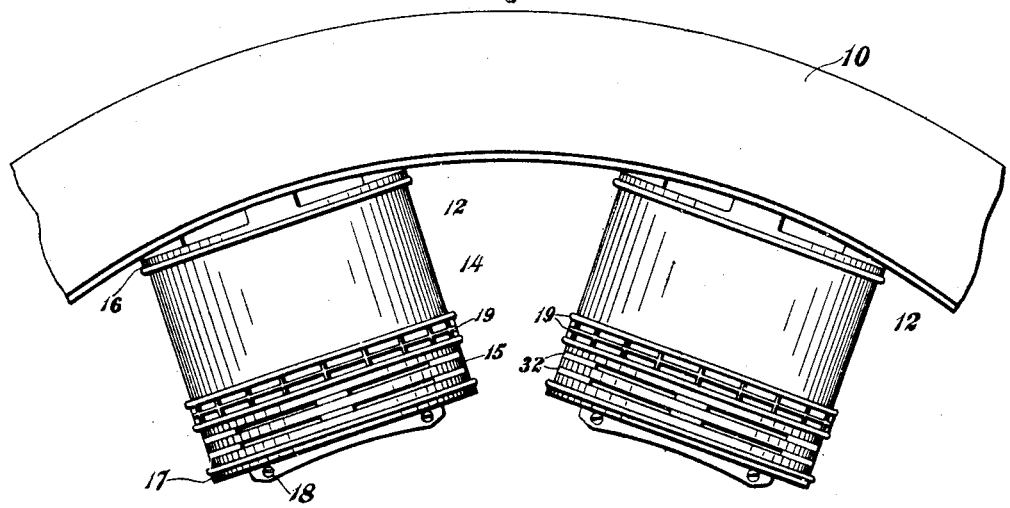
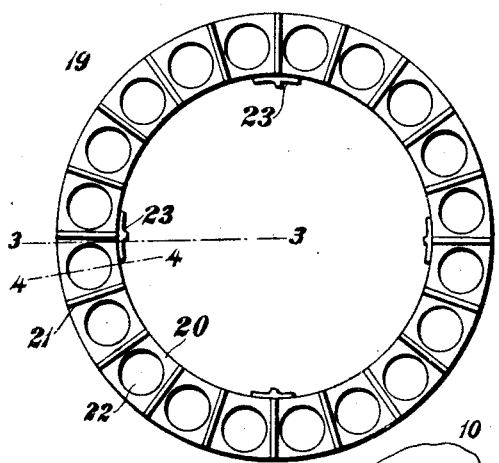
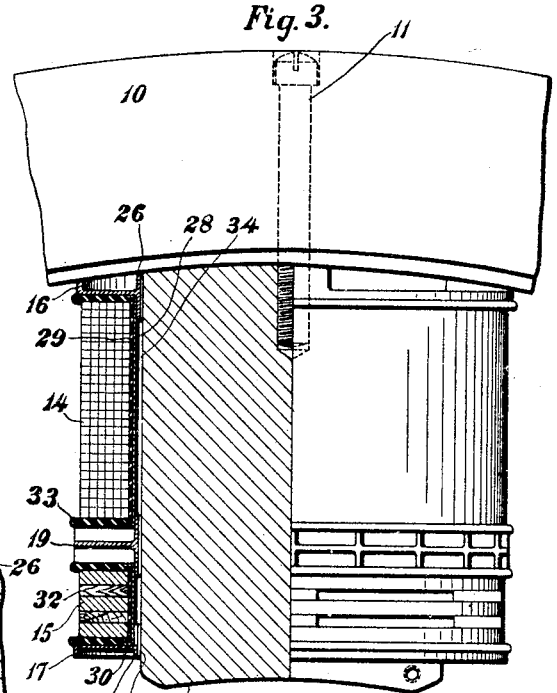
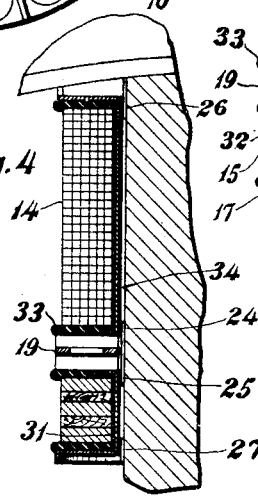
WITNESSES
INVENTOR
William D. Pomeroy
By
ATTORNEY

UNITED STATES PATENT OFFICE.

WILLIAM D. POMEROY, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

DYNAMO-ELECTRIC MACHINE.

957,249. Specification of Letters Patent. Patented May 10, 1910.

Application filed May 3, 1906. Serial No. 314,923.

*To all whom it may concern:*

Be it known that I, WILLIAM D. POMEROY, citizen of the United States, residing at Norwood, in the county of Hamilton and State of Ohio, have invented certain new and useful Improvements in Dynamo-Electric Machines, of which the following is a full, clear, and exact specification.

My invention relates to dynamo-electric machines and particularly to the field magnets thereof.

The object of my invention is to so construct the field magnets that the coils will be effectively ventilated and the temperature always maintained within safe limits.

My invention is applicable to both rotary and stationary field magnets, whether series, shunt or compound-wound, but is especially adapted for compound-wound stationary magnets.

In carrying out my invention I divide the coils of the field magnets into parts or sections and separate adjacent parts or sections by ribbed collars or skeleton-frames which permit a good circulation of air around the coils.

More specifically considered my invention consists of a field member for dynamo-electric machines having compound-wound field magnets provided with ventilating passage-ways between the coils and the poles, and the series and shunt coils being spaced apart by separators so constructed that there is a good circulation of air around the parts of the coils.

My invention still further consists in the details of construction and combinations of elements described in the specification and set forth in the appended claims.

For a better understanding of my invention, reference is had to the accompanying drawings, in which—

Figure 1 is a partial elevation of the stationary field frame of a dynamo-electric machine, showing two adjacent field magnets having my invention applied thereto; Fig. 2 is a plan view of a spacing collar or separator for the coils; Fig. 3 is a sectional elevation of a field magnet attached to the field frame, the section being taken in a plane corresponding to the line 3—3 of Fig. 2; and Fig. 4 is a section of a field magnet, the section being taken in a plane corresponding to the line 4—4 of Fig. 2.

Referring now to the figures of the drawing, I have shown at 10 a portion of a stationary field frame of a dynamo-electric machine. Extending radially inward from the frame and secured thereto by bolts 11 are a plurality of field magnets 12, two of which are shown in Fig. 1. The pole-pieces 13 of the field magnets are provided with shunt field coils 14, and series field coils 15, the coils being held between the outer coil-seats 16 and inner coil-seats 17, the latter being held to the ends of the pole by bolts or screws 18. The pole pieces are in this case circular in cross section but it is to be understood that my invention can be applied equally well to poles of any other shape.

In order that the coils may be well ventilated I divide the coil or coils on each pole into parts or sections, and space the latter apart by separators which are so constructed that there is a good circulation of air around the coils. In this case I have shown on each pole a single separator 19 between the series and shunt coils. If necessary, however, the coils can be further divided and the parts spaced apart by separators. The separators are preferably made from cast non-magnetic metal and consist in this case of skeleton-frames or ribbed collars which completely encircle the field poles. Each collar or frame consists, in this case, of a ring-shaped plate 20 having on each side a large number of integral, radial ribs 21 at right angles thereto and extending across the plate from the inner to the outer periphery. The plate is provided with openings or apertures 22 to decrease the weight of the collar and to promote the circulation of air. It is seen that the plate 20 serves as a web to connect all the ribs. As will appear the inner diameter of the collar is slightly larger than the diameter of the pole, the collar being provided at its inner surface with a number of bearing or supporting lugs 23, four being here shown. The lugs bear against the pole so as to center the collar relative thereto, and to space the coils from the pole, the lugs extending slightly above and below the ribs as shown at 24 and 25. The upper and lower coil seats 16 and 17 are likewise provided with lugs 26 and 27 respectively shown in Figs. 3 and 4 for centering the seats relative to the pole and for spacing the coils from the pole.

The shunt coil 14 is mounted on a metal spool 28, a layer of insulation 29 being interposed between the spool and coil. The series coil is mounted on a metal spool 30, the spool and coil being separated by a layer of insulation 31. The series coil consists in this case of a heavy bar of conducting material, the individual turns being spaced apart by insulating blocks 32. As is shown, the series and shunt coils are supported on the coil seats and ribs of the collar 19, the coils being held from the pole by the lugs 23 of the collar and lugs 26 and 27 of the coil seats. The coils are separated from the coil seats and spacing collar by fiber or other insulating sheets or plates 33. Thus it is seen that by spacing the coils from the poles ventilating passageways 34 are provided between the coils and the poles, and by means of the ribbed collars passageways are provided which communicate with the passageways 34. By referring to Fig. 4, it is seen that not only can there be a circulation of air through the passageways 34 between the coils and the poles, from one end of the pole to the other, but air can pass to or from said passageways through the passageways formed by the ribbed collars 19.

It is evident that many changes and modifications can be made in the details of construction without departing from the spirit and scope of my invention, and I aim in my claims to cover all such modifications.

What I claim as new and desire to secure by Letters Patent is:—

1. In a field magnet, a field pole having a series and shunt coils, and a ventilating collar surrounding the pole and separating the series from the shunt coils, said collar having portions extending between the pole and the coils so as to separate the latter from the pole.

2. In a field magnet, a field pole having series and shunt coils, and a ribbed ventilating ring or collar surrounding the pole and separating the series and shunt coils from each other, said collar having portions extending between the pole and the coils so as to hold the latter from the pole and to provide ventilating passageways.

3. In a field magnet, a field pole, series and shunt coils on said pole, the field magnet being provided with ventilating passageways between the pole and coils, and a separating frame or collar between the series and shunt coils, said frame having ribs or partitions forming passageways which communicate with the passageways between the pole and coils.

4. In a field magnet, a field pole, series and shunt coils on said pole, and means for spacing said coils from the pole, said means comprising a ribbed collar between the series and shunt coils.

5. As an article of manufacture, a ventilating collar for field magnets comprising a plate having integral lateral ribs on the sides, and a plurality of lugs on the inner surface.

In testimony whereof I affix my signature, in the presence of two witnesses.

WILLIAM D. POMEROY.

Witnesses:
ARTHUR F. KWIS,
FRED J. KINSEY.